United States Patent [19]

Inoue et al.

[11] Patent Number: 4,814,888

[45] Date of Patent: Mar. 21, 1989

[54] HIGHLY SENSITIVE IMAGE PICKUP APPARATUS

[75] Inventors: Hiroo Inoue; Toshitake Kouyama; Masashi Onosato, all of Tokyo, Japan

[73] Assignee: NEC Corporation, Japan

[21] Appl. No.: 79,173

[22] Filed: Jul. 29, 1987

[30] Foreign Application Priority Data

Jul. 30, 1986 [JP] Japan .................................. 61-180549
May 26, 1987 [JP] Japan .................................. 62-130171

[51] Int. Cl.[4] ............................................. H04N 5/30
[52] U.S. Cl. ................................... 358/211; 358/217; 358/219
[58] Field of Search ........................ 358/217, 219, 211

[56] References Cited

U.S. PATENT DOCUMENTS

| | | | |
|---|---|---|---|
| 2,402,053 | 6/1946 | Kell ..................................... | 358/211 |
| 2,700,066 | 1/1955 | Vorms ................................. | 358/211 |
| 3,090,829 | 5/1963 | Lee et al. ............................ | 358/211 |
| 3,716,657 | 2/1973 | Niemyer, Jr. ........................ | 358/211 |
| 4,223,341 | 9/1980 | Drewery .............................. | 358/12 |
| 4,400,717 | 8/1983 | Southworth et al. ............... | 358/13 |
| 4,503,466 | 3/1985 | Ryan ................................... | 358/211 |
| 4,593,321 | 6/1986 | Blom et al. .......................... | 358/219 |
| 4,595,955 | 6/1986 | Groves et al. ...................... | 358/219 |

*Primary Examiner*—Jin F. Ng
*Assistant Examiner*—Stephen Brinich

*Attorney, Agent, or Firm*—Ostrolenk, Faber, Gerb & Soffen

[57] ABSTRACT

This image pickup apparatus is capable of picking up very low level images, such as a star or a comet in a night sky, and is capable of obtaining a video signal having a desired S/N ratio without using a conventional noise reducer. The apparatus comprises a television camera including an image pickup tube, a field memory for storing a video signal delivered from the television camera, and a write-inhibiting control circuit, wherein a period of beam scanning for generating the video signal in the image pickup tube is extended to n-times the standard field period for increasing the sensitivity of the image pickup tube. Writing to the field memory is inhibited in other periods except for the beam scanning period, while a normal television signal is continuously obtained from the field memory. A key signal corresponding to dark portions of the image that are not to be enhanced may be generated and stored in an area memory, and then read out from the area memory during every standard field period. An imaging control circuit responsive to the imaging control signal and the key signal then controls the image pickup device, such that it extracts a video signal from the whole of an imaging area during the period of one field designated by the imaging control signal, and extracts a video signal from a partial area apecified by the key signal during other field periods.

7 Claims, 3 Drawing Sheets

HIGHLY SENSITIVE IMAGE PICKUP APPARATUS

BACKGROUND OF THE INVENTION

The present invention relates to a highly sensitive image pickup apparatus which is capable of imaging even at a low illumination level and which is suitable, for example, for observing a star or a comet in a night sky.

An image pickup apparatus of this kind has conventionally comprised a combination of a highly sensitive television (TV) camera, and a noise reducer for improving the S/N ratio of a video signal delivered from the television camera. When a comet, which is observed only dimly in deep space by the naked eye, is picked up by a conventional highly sensitive color TV camera, a satisfactory video signal cannot be obtained from the TV camera. Therefore, it has generally been necessary to improve the S/N ratio of the video signal by means of the noise reducer.

The basic principle of a noise reducer is described below. A digitized input video signal is multiplied by a coefficient $(1-k)$ by a multiplier, and a one-frame delayed video signal which has been delayed in a one-frame delay line is multiplied by a coefficient $(K)$ by another multiplier. These multiplied signals are added by an adder and an added output signal thereby is further fed to the one-frame delay line. Thus, the input video signal is recursively processed through the one-frame delay line and multiplied by the coefficient $(K)$ after being multiplied with the coefficient $(1-K)$. As a result, the video signal having correlation and the noise having non-correlation are averaged and the S/N ratio is improved. In case a comet or a star is imaged (picked up) by a television camera, since the obtained video image can be considered to be virtually a stationary image and the noise has no correlation, the S/N improvement factor obtained can be expressed by the following equation:

$$S/N \text{ improvement factor} = 10 \log \frac{1+K}{1-K} \, dB$$

The above-described conventional highly sensitive image pickup apparatus has the disadvantage that it is necessary to use a relatively complicated and expensive noise reducer in combination with a television camera, and a video signal is not always improved satisfactorily by such noise reducer.

SUMMARY OF THE INVENTION

It is, therefore, an object of the present invention to provide a novel highly sensitive image pickup apparatus which is capable of obtaining a video signal having a desired S/N ratio without using a noise reducer.

In accordance with the present invention, there is provided a highly sensitive image pickup apparatus which comprises a television camera including an image pickup tube, a field memory for storing a video signal delivered from the television camera, and a write-inhibiting control circuit, wherein a period of beam scanning for delivering the video signal in the image pickup tube of the television camera is extended to n-times the standard field period for increasing the sensitivity of the image pickup tube, writing to the field memory is inhibited in other periods except for the beam scanning period, and a normal television signal is continuously obtained from the field memory.

According to another feature of the present invention, there is provided a highly sensitive image pickup apparatus which comprises a imaging control signal generator for generating an imaging control signal having a pulse width of one field period in a cyclic period of n ($n \geq 2$) times the standard field period (television vertical scanning period), and an image pickup device for extracting a video signal photoelectrically converted from a visual image. A slicing circuit slices the video signal from the image pickup device by a threshold level to produce an area signal which indicates an area having a signal level smaller than the threshold level, and an area memory for storing the area signal during a period of one field designated by the imaging control signal to deliver a key signal for every field. An imaging control circuit responsive to the imaging control signal and the key signal controls the image pickup device, such that it extracts a video signal from the whole of an imaging area during the period of one field designated by the imaging control signal, and extracts a video signal from a partial area specified by the key signal during other field periods. A video memory is responsive to the imaging control signal and key signal for storing the video signal from the image pickup device is such that it stores the video signal extracted from the whole imaging area during one field designated by the imaging control signal and stores the video signal extracted from the partial area during the other fields, wherein a video signal stored in the video memory is continuously read out for every field.

PREFERRED EMBODIMENTS OF THE INVENTION

Figure 1:
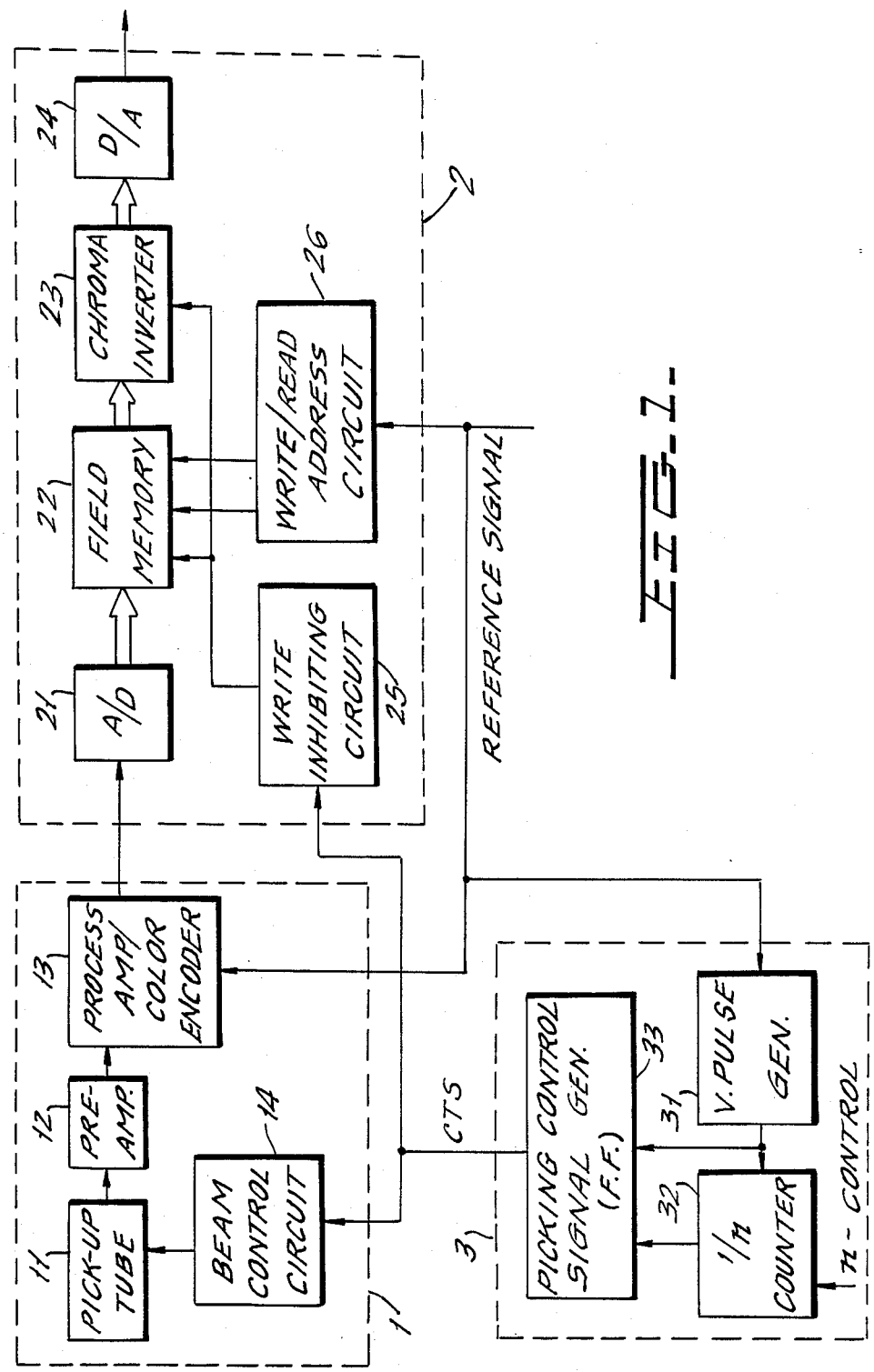
FIG. 1 is a block diagram of an embodiment according to the present invention.

FIG. 1 is a block diagram of a first embodiment of the present invention which comprises a television camera 1, an intermittent freeze circuit 2, and a beam control pulse generator 3. The television camera 1 includes an image pickup tube 11, a pre-amplifier 12, a process amplifier/color encoder 13, and a beam control circuit 14. In the present invention, the S/N ratio of a video signal, i.e., of the sensitivity of the television camera, is improved by making a scanning beam intermittent to extend the storage time (photoelectric-converting time) of the image pickup tube 11.

Figure 2:
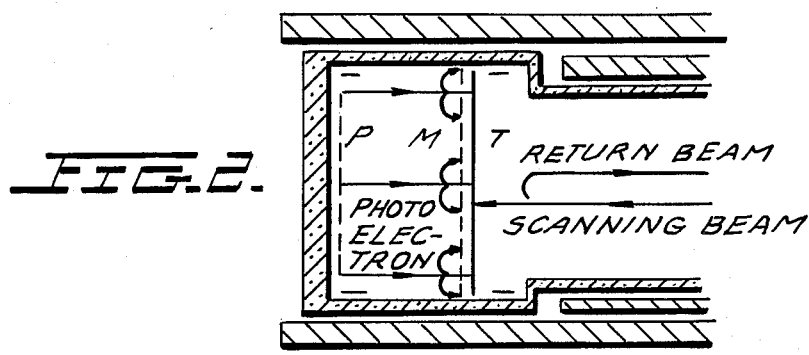
FIG. 2 is a partial view of an image orthicon, which is illustrated, for explaining an operating principle of the present invention.

FIG. 2 is a partial detail view of an image orthicon which is used as the image pickup tube in this embodiment. In FIG. 2 P denotes a photoelectric plane on an inner surface of a face plate. An optical image is formed on the photoelectric plane through a lens assembly (not shown) and photoelectrons are emitted from the photoelectric plane in proportion to the luminous flux of incident light. These photoelectrons are made to bombard a target T by an acceleration electric field and a focussing magnetic field and thus, the target T emits secondary electrons which are captured by a target mesh M. The target surface therefore has a high potential due to the emission of the secondary electrons. A portion of the target surface corresponding to a brighter portion of the optical image formed on the photoelectric plane emits a larger number of secondary electrons, and thus has a higher potential, so that an electric potential image is formed on the target surface.

The lower limit of the luminous flux of the incident light for operating the image pickup tube is determined according to a desired S/N ratio of a video signal and a desired resolution. To obtain a video signal, a scanning beam delivered from a cathode (not shown) of the tube is applied to the target T. In this case, when the scanning beam lands at a portion of the target having a high potential, a return beam therefrom is reduced. On the other hand a beam amount in landing is reduced at a portion having a low potential is reduced so that the return beam therefrom is increased. In this way, the return beam is modulated by the potential image on the target and a video signal is formed. Since the electric charges forming the electrical potential image are neutralized by the beam landing, the beam scanning must be carried out with a beam density capable of neutralizing the potential. However, if the density of the scanning beam is increased, noise is also increased and the beam spot of beam scanning becomes larger, resulting in a deterioration of the resolution. Further, if the beam scanning of the image pickup tube is performed at a speed corresponding to the standard television scanning speed of the NTSC system in case the magnitude of the luminous flux of the incident light is small, for example, in the case of imaging of a comet, the S/N ratio of the video signal deteriorates.

According to the embodiment of FIG. 1, the generation period of the scanning beam is extended under the control of the beam control circuit 14. That is, the beam lands on only one field (16 milliseconds) during n NTSC field periods (for example, 16 fields (0.26 seconds)), whereby the period of the charge neutralization is set to one field for every n NTSC fields. It is therefore possible to obtain an image of electric potentials proportional to integrated amounts of the luminous flux of incident light during the period of the n NTSC fields and, thus, to obtain a potential image with n time the sensitivity relative to that obtained when the scanning beam is landed only once in every field. On the one hand, the noise component has no correlation, so that integrated values thereof are therefore substantially zero, while on the other hand, the video signal is multiplied n times. Consequently, the S/N ratio of the video signal is improved.

In the embodiment of FIG. 1, the TV camera including the image orthicon of FIG. 2 is used, but a TV camera containing any other pickup tube may also be used. In addition, the present invention may be applied to a highly sensitive SIT (silicon intensifier target) camera.

Figure 3:
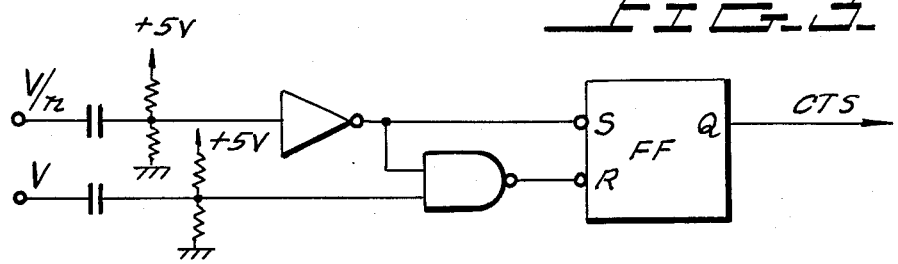
FIG. 3 is a schematic diagram of a circuit for generating a control signal to enable an intermittent beam scanning in an image pickup tube according to the present invention.
Figure 4:
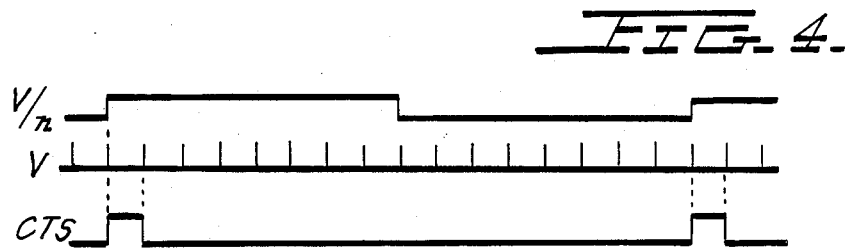
FIG. 4 is a timing chart for explaining the operation of the circuit shown in FIG. 3.

The beam control pulse generator 3 generates a control signal for producing an intermittent scanning beam. This generator 3 comprises a V-pulse generator 31 which receives a reference sync (reference black burst) signal and extracts a vertical sync V-pulse, a counter 32 which frequency-divides the V-pulse by n, and a set dominant RS flip-flop 33 which receives the V-pulse and an output of the counter 32 and generates an imaging control signal CTS having a pulse width of one field for every n NTSC fields. An example of the configuration of the circuit 33 is shown in FIG. 3. FIG. 4 is a timing chart showing operation of the circuit of FIG. 3.

As described above, in the present invention, the S/N ratio of the fetched video signal is improved by making the scanning beam of the pickup tube intermittent. The output signal from the pickup tube 11 with the improved S/N ratio is converted into a color video signal by a pre-amplifier 12 and a process amplifier/color encoder 13.

In this case, the video signal delivered from the TV camera 1 is an intermittent signal which is present only one field in every n fields and is then converted into a standard NTSC color television signal by an intermittent freeze circuit 2. In the intermittent freeze circuit 2, the intermittent video signal is converted into a digitized signal by a A/D converter 21 and is then written into a field memory 22 in synchronism with the control signal CTS and, therefore, the writing operation is inhibited in the remaining (n−1) fields. To this end, the control signal CTS is supplied to a write-inhibiting control circuit 25. The video signal written in the field memory 22 is repeatedly read out from this memory 22 in every NTSC field and, then, supplied to a chroma inverter 23 to produce a non-intermittent video signal. In this case, since the video content of the one field is repeatedly read out during the n-field period, the thus-obtained video signal is modified by the chroma inverter 23 to have the continuous phases of a color subcarrier, i.e., the standard color television sequences (4 field sequence). In order to control the chroma inverter 23, a freeze signal (the control signal CTS) is supplied from the write inhibiting control signal. The video signal delivered from the chroma inverter 23 then is outputted via a D/A converter 24. The intermittent freeze circuit 2 also contains a write/read address generator 26.

The intermittent freeze circuit 2 shown in FIG. 1 has a configuration that is substantially the same as that of a television synchronizing apparatus which is known as a frame synchronizer. A synchronous converter having a memory capacity of one field is described in U.S. Pat. No. 4,007,486 "Phase Locking System For Television Signal Using a Digital Memory Technique".

In the first embodiment shown in FIG. 1, the S/N ratio of the video signal is improved by extending the period in which a video signal is formed in the pickup tube. However, when a night sky is imaged, for example, a disadvantageous shading characteristic contained in the pickup tube often causes a problem that a dark area in the night sky does not appear as real darkness, but is unnaturally colored because the extension of the storage period in the pickup tube emphasizes the shading characteristic. Particularly, when the SIT camera is used, such shading problem occurs noticeably. In addition, the above-described system for inhibiting the delivery of a video signal from the pickup tube, causes a video signal to be supplementally produced by the freeze function. This causes noise to be also expressed as a stationary image in this period, which causes the whole monitor screen seems a fixed image.

In a second embodiment of the present invention, the S/N ratio of the video signal, i.e., the sensitivity of the television camera, is improved by increasing the storage period in the pickup tube only in the region to be enhanced within the entire imaging area, and by operating normally in the rest of the imaging area i.e., by extracting a video signal in every NTSC field from the unenhanced region. As a result, a natural video screen can be obtained and the shading of the pickup tube is not emphasized.

Figure 5:
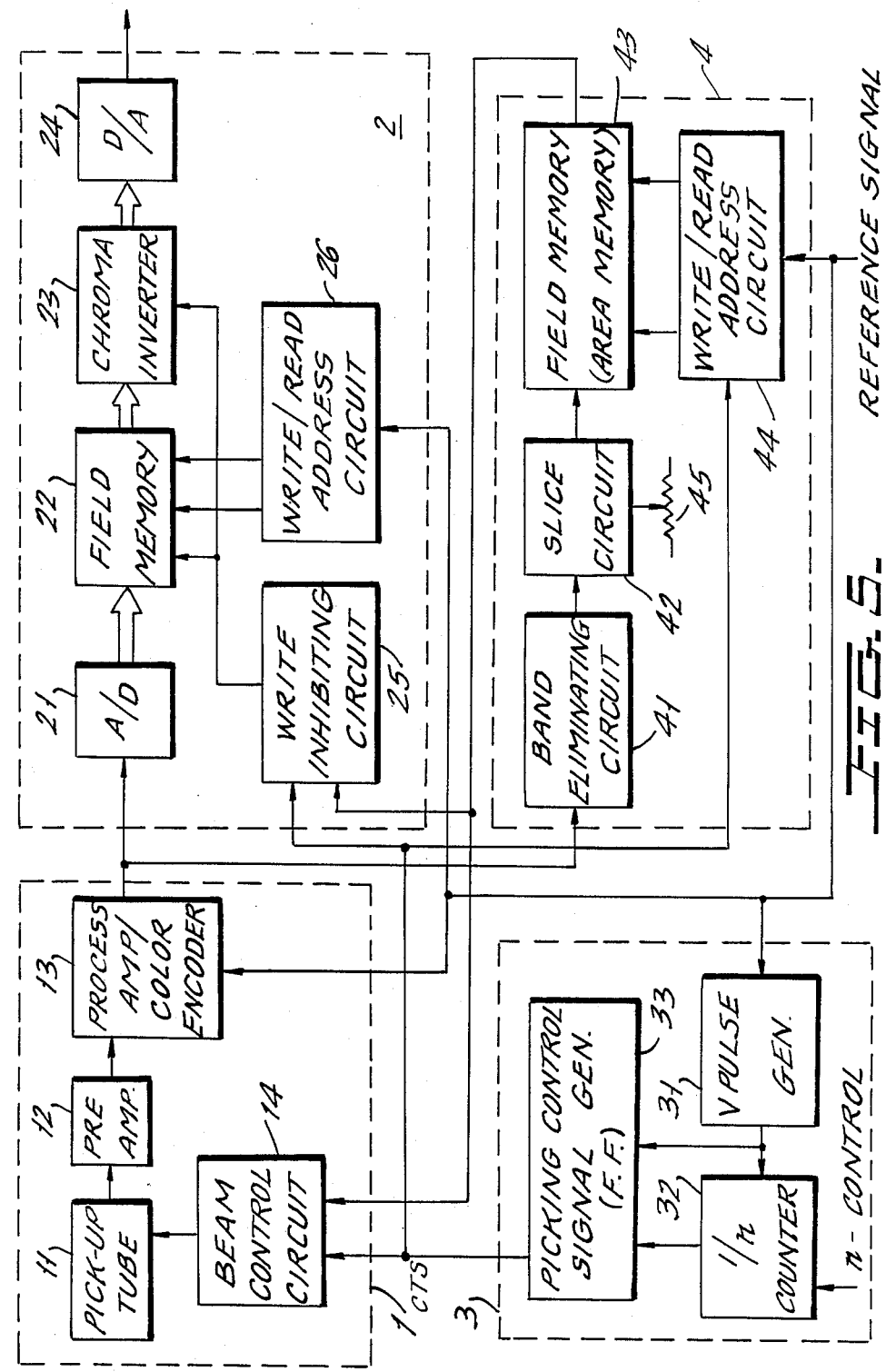
FIG. 5 is a block diagram of a second embodiment according to the present invention.

The second embodiment shown in FIG. 5 is constructed by adding a key signal generator 4 to the circuit configuration of the first embodiment shown in FIG. 1. The key signal generator 4 generates a key signal indicating the region to be enhanced in the imaging area, and comprises a band-eliminating filter 41, a level slice circuit 42, a field memory (area memory) 43, and a write/read address generator 44.

The band-eliminating filter 41 eliminates signal components over 3.5 MHz to eliminate the chrominance component. The slice circuit 42 receives a video signal delivered from the filter 41 and slices the video signal by a threshold level which can be changeably set by a threshold setting device 45. As a result, an area signal is obtained from the slice circuit 42 to designate a region in which the level of the luminance is greater than the threshold level.

Figure 6A:
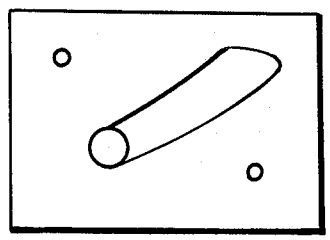
FIGS. 6(a) and 6(b) are drawings which illustrate the operation of the embodiment shown in FIG. 5.
Figure 6B:
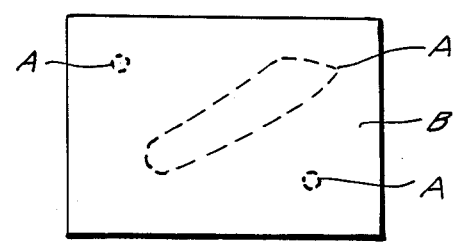

FIGS. 6(a) and 6(b) illustrate this operation. FIG. 6(a) shows the video signal over the whole of the imaging area, which have been extracted in the field designated by the control signal CTS, and FIG. 6(b) shows the area signal delivered by the slice circuit 42. The area signal divides the screen into a region A in which the level of the video signal is greater than the threshold level, and another region B. In this case, each region A corresponds to an object to be imaged. The area signal delivered from the slice circuit 42 is stored into the area memory 43 and, in this case, the writing operation is performed in only the field designated by the control signal CTS. However, the area signal is read out from the area memory 43 in every field, and the output area signal is sent as a key signal to a beam control circuit 14 in the television camera 1 and to a write-inhibiting control circuit 25 in the intermittent freeze circuit 2.

In the television camera 1, by supplying the key signal to the beam control circuit 14, a video signal corresponding to the region A is extracted only in the field designated by the control signal CTS but a video signal corresponding to the region B is extracted in every NTSC field. In other words, the video signal is extracted from the entire imaging area in the field designated by the control signal CTS, and, in the other fields, the video signal is extracted from only the region B. In the same manner, in the intermittent freeze circuit 2, by supplying the key signal to the write-inhibiting control circuit 25, the video signal corresponding to the region A (i.e., the entire area) is written into the field memory 22 only in the field designated by the control signal CTS, but the video signal of the region B is written into the field memory 22 in every field.

As described above, with respect to the regions A, the video signal, which is picked up during only the field designated by the control signal CTS, is read out from the field memory 22 and, with respect to the other region B, the video signal, which is picked up in every field, is read out from the field memory 22 in every field.

The chroma inverter 23 receives the freeze signal associated with the key signal from the write inhibiting control circuit 25 and makes the phases of the subcarrier continuous in the region A, whereby the standard NTSC television signal is obtained.

As described above, according to the present invention an image pickup apparatus suitable for imaging a faint light object such as the night sky is obtained by extending the storage time of the pickup tube. Further, according to the present invention, an image pickup apparatus capable of minimizing the disadvantageous influence of the shading characteristic in the pickup tube, and of obtaining a natural video picture with a high S/N ratio, is obtained by providing the sensitivity increasing effect only an area of a comet or a star to be imaged.

What is claimed is:

1. A highly sensitive image pickup apparatus comprising:

means for generating a control signal having a period of a predetermined number n (n≧2) times a predetermined standard television vertical scanning field period and a duration substantially corresponding to one said predetermined standard field period;

image pickup means for receiving a visual image and photoelectrically converting said image into a video signal;

means for generating a key signal defining a region that is intended to be sensitively imaged in said visual image;

control means responsive to said control signal and said key signal for controlling said image pickup means such that said image pickup means generates a video signal from the whole of said visual image during the period of one said field period designated by said control signal, and generates a video signal from only a part of said visual image defined in accordance with said key signal during other standard field periods than said one field period; and memory means responsive to said control signal and said key signal for receiving and storing said video signal generated by said image pickup means such that said memory means stores said video signal generated from the whole of said visual image during said one field period designated by said control signal, and stores said video signal generated from only a part of said visual image defined in accordance with said key signal during said other standard field periods, and for reading out a corresponding video signal stored in said memory means continuously for every standard field period.

2. A highly sensitive image pickup apparatus according to claim 1, further comprising chroma inverter means for keeping continuity of phases of a color subcarrier contained in the video signal read out from said memory means for every standard field period.

3. An apparatus as in claim 1, wherein said control signal is a pulse signal and said duration is a pulse width thereof.

4. A highly sensitive image pickup apparatus comprising:

means for generating a control signal having a period of a predetermined number n (n≧2) times a predetermined standard television field period and a duration substantially corresponding to one said predetermined standard field period;

image pickup means for receiving a visual image and photoelectrically converting said image into a video signal;

slice means for receiving and slicing said video signal generated by said image pickup means by a predetermined threshold level to produce an area signal which indicates an area having a video signal level smaller than said threshold level;

area memory means for receiving and storing said area signal produced by said slice means during a period of one field period designated by said duration of said control signal, and reading out the area signal stored in said area memory means for every standard field period to produce a key signal;

control means responsive to said control signal and said key signal for controlling said image pickup means such that said image pickup means generates a video signal from the whole of said visual image during the period of said one field period designated by said control signal, and generates a video signal from only a part of said visual image corresponding to said key signal during other standard fields periods than said one field period; and video storage means responsive to said control signal and said key signal for receiving and storing said video signal generated by said image pickup means such that said video storage means stores said video signal generated from the whole of said visual image during the period of said one field period designated by said control signal, and stores said video signal generated from only a part of said visual image corresponding to said key signal during said other standard field periods, and reading out a corresponding video signal stored in said video storage means for every standard field period.

5. A highly sensitive image pickup apparatus according to claim 4, wherein said video storage means comprises a one field memory, a write address generating circuit for generating a writing address, a read address generating circuit for generating a reading address, and a writing control circuit for controlling the writing operation in said one field memory in response to said control signal and said key signal.

6. A highly sensitive image pickup apparatus according to claim 4, wherein said video storage means further comprises a chroma inverter responsive to said key signal for keeping the continuity of a phase of a color subcarrier contained in the video signal read out from said video storage means for every standard field period.

7. An apparatus as in claim 4, wherein said control signal is a pulse signal and said duration is a pulse width thereof.

* * * * *